(12) United States Patent
Scheuring, III et al.

(10) Patent No.: US 7,011,188 B2
(45) Date of Patent: Mar. 14, 2006

(54) CABLE TENSION SENSING DEVICE

(75) Inventors: Joseph F. Scheuring, III, Newmarket (CA); Terry L. Reid, Alliston (CA)

(73) Assignee: Ventra Group Inc., Bradford (CA)

( * ) Notice: Subject to any disclaimer, the term of this patent is extended or adjusted under 35 U.S.C. 154(b) by 0 days.

(21) Appl. No.: 10/650,037

(22) Filed: Aug. 28, 2003

(65) Prior Publication Data

US 2004/0129508 A1    Jul. 8, 2004

Related U.S. Application Data

(60) Provisional application No. 60/406,302, filed on Aug. 28, 2002.

(51) Int. Cl.
*F16D 65/36*    (2006.01)
*F16C 1/10*     (2006.01)

(52) U.S. Cl. .................. 188/2 D; 192/219.4; 188/156; 74/501.5 R

(58) Field of Classification Search ............... 188/2 D, 188/156, 162; 74/501.5 R, 502.4; 192/219.4; 701/70
See application file for complete search history.

(56) References Cited

U.S. PATENT DOCUMENTS

| | | |
|---|---|---|
| 3,791,210 A | 2/1974 | Taylor |
| 3,871,217 A | 3/1975 | Miley |
| 3,938,406 A | 2/1976 | Nisbet |
| 3,943,761 A | 3/1976 | Shoberg et al. |
| 4,158,962 A | 6/1979 | Conoval |
| 4,175,646 A | 11/1979 | Eikelberger |
| 4,245,139 A | 1/1981 | Orscheln et al. |
| 4,265,110 A | 5/1981 | Moulin |
| 4,271,718 A | 6/1981 | Bopp et al. |
| 4,281,736 A * | 8/1981 | Lizzio ........................ 180/271 |
| 4,318,308 A | 3/1982 | Monteillet |
| 4,373,402 A | 2/1983 | Barrett |
| 4,561,527 A * | 12/1985 | Nakamoto et al. ....... 192/219.4 |
| 4,569,489 A | 2/1986 | Frey et al. |
| 4,629,043 A * | 12/1986 | Matsuo et al. ........... 192/219.4 |
| 4,679,771 A | 7/1987 | Johnson |
| 5,180,038 A * | 1/1993 | Arnold et al. .............. 188/2 D |
| 5,358,219 A | 10/1994 | Shenk et al. |
| 5,542,513 A * | 8/1996 | Reyes ..................... 192/219.4 |
| 5,667,282 A | 9/1997 | Kim |
| 5,868,037 A | 2/1999 | Pohling |
| 5,910,194 A | 6/1999 | Cho |

(Continued)

FOREIGN PATENT DOCUMENTS

DE    101 02 685 A1    8/2002

(Continued)

*Primary Examiner*—Chris Schwartz
(74) *Attorney, Agent, or Firm*—Pillsbury Winthrop Shaw Pittman LLP

(57) ABSTRACT

A sensing device for sensing an amount of force transferred between a first element and a second element includes a first attachment structure and a second attachment structure mounted to the first attachment structure to enable relative linear movement between the first and second attachment structures. The first attachment structure is connected to the first element and the second attachment structure is connected to the second element. An actuating member is provided on one of the first and second attachment structures. A biasing structure is positioned between the first and second attachment structures enabling a force to be transferred from the first element and the first attachment structure to the second element and the second attachment structure. A sensor includes a first switch and a second switch each being adapted to be actuated by the actuating member.

15 Claims, 10 Drawing Sheets

U.S. PATENT DOCUMENTS

| | | |
|---|---|---|
| 5,970,814 A | 10/1999 | Smith et al. |
| 5,983,745 A | 11/1999 | Petrak |
| 6,139,117 A | 10/2000 | Shirai et al. |
| 6,193,022 B1 | 2/2001 | Bode |
| 6,213,259 B1 * | 4/2001 | Hanson et al. ............... 188/156 |
| 6,223,624 B1 | 5/2001 | Iwanaga et al. |
| 6,244,394 B1 * | 6/2001 | Gutierrez et al. ........... 188/72.8 |
| 6,249,737 B1 * | 6/2001 | Zipp ............................ 701/70 |
| 6,513,632 B1 * | 2/2003 | Peter ........................... 188/162 |
| 6,522,967 B1 * | 2/2003 | Pfeil et al. .................... 701/70 |
| 6,609,595 B1 * | 8/2003 | Flynn et al. ................. 188/156 |
| 6,629,586 B1 * | 10/2003 | Smyly et al. ............ 188/106 R |
| 6,655,506 B1 * | 12/2003 | Pfeil et al. ................... 188/156 |
| 6,655,507 B1 * | 12/2003 | Miyakawa et al. ......... 188/171 |
| 6,755,284 B1 * | 6/2004 | Revelis et al. ............... 188/2 D |
| 2001/0030093 A1 | 10/2001 | Lundholm et al. |
| 2002/0003068 A1 | 1/2002 | Sundqvist et al. |

FOREIGN PATENT DOCUMENTS

| | | |
|---|---|---|
| JP | 5-139269 | 6/1993 |
| JP | 8-127317 | 5/1996 |
| WO | WO 98/56633 | 12/1998 |
| WO | WO 02/057122 A1 | 7/2002 |

* cited by examiner

CABLE TENSION SENSING DEVICE

The present application claims priority to U.S. Provisional Application of Scheuring III et al., Ser. No. 60/406,302 filed on Aug. 28, 2002, the entirety of which is hereby incorporated into the present application by reference.

FIELD OF THE INVENTION

The present invention relates to sensing devices for sensing the tension in cables. More particularly, the present invention relates to sensing devices for sensing the tension in brake cables associated with brake mechanisms of a vehicle.

BACKGROUND OF THE INVENTION

Devices for sensing the tension in brake cables are known in the art. Examples of devices for sensing the tension in brake cables are shown in U.S. Pat. Nos. 3,938,406, 4,245,139, and 4,569,489.

The present invention provides improvements over known cable tension sensing devices.

SUMMARY OF THE INVENTION

One aspect of the present invention relates to an improved sensing device for sensing the amount of tension being applied to an element such as a brake cable operatively connected to brake mechanisms of a vehicle. This aspect of the invention provides a sensing device for sensing an amount of force transferred between a first element and a second element. The sensing device comprises a first attachment structure and a second attachment structure mounted to the first attachment structure to enable relative linear movement between the first and second attachment structures in opposing first and second directions. The first attachment structure is configured to be operatively connected to the first element and the second attachment structure configured to be operatively connected to the second element. An actuating member is provided on one of the first and second attachment structures. A biasing structure is positioned between the first and second attachment structures. The biasing structure enables a force to be transferred from the first element and the first attachment structure to the second element and the second attachment structure through the biasing structure with the biasing structure resiliently deflecting to allow relative linear displacement between the first and second attachment structures in an amount related to a magnitude of the force. A sensor includes a first switch and a second switch. Each of the first and second switches is adapted to be actuated by the actuating member. The actuating member is positioned to actuate the first switch upon reaching a predetermined maximum linear displacement between the first and second attachment structures and the actuating member is positioned to actuate the second switch upon reaching a predetermined minimum linear displacement between the first and second attachment structures.

Another aspect of the invention relates to a brake actuator for actuating brake mechanisms of a vehicle. The brake actuator includes a reversible motor. An activation member is operatively connected to the motor. The motor is selectively actuatable to move the activation member in a brake-applying direction and a brake-releasing direction. A brake cable is operatively connected between the activation member and the brake mechanisms of the vehicle such that (a) actuation of the motor to move the activation member in the brake-applying direction applies a force to the brake cable to increase tension in the brake cable, and (b) actuation of the motor to move the activation member in the brake-releasing direction releases the force to reduce the tension in the brake cable. The brake actuator includes a sensing device for sensing a magnitude of the force transferred between the activation member and the brake cable. The sensing device includes a first attachment structure and a second attachment structure mounted to the first attachment structure to enable relative linear movement between the first and second attachment structures in opposing first and second directions. The first attachment structure is operatively connected to the activation member and the second attachment structure is operatively connected to the brake cable. An actuating member is provided on one of the first and second attachment structures. A biasing structure is positioned between the first and second attachment structures. The biasing structure enables the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force. A sensor includes a first switch and a second switch. Each of the first and second switches is adapted to be actuated by the actuating member. The actuating member is positioned to actuate the first switch upon reaching a predetermined maximum linear displacement between the first and second attachment structures. The actuating member is positioned to actuate the second switch upon reaching a predetermined minimum linear displacement between the first and second attachment structures. A control assembly is connected between the motor and the sensor of the sensing device. The control assembly is operable to cease rotation of the motor in the brake-applying direction upon the first switch being actuated by the actuating member and to cease rotation of the motor in the brake-releasing direction upon the second switch being actuated by the actuating member.

Still another aspect of the invention relates to a vehicle including a wheel assembly and a brake mechanism mounted to the wheel assembly. The brake mechanism is operable to apply a braking force to the wheel assembly. The vehicle includes a brake actuator for actuating the brake mechanism of the wheel assembly. The brake actuator includes a reversible motor. An activation member is operatively connected to the motor. The motor is selectively actuatable to move the activation member in a brake-applying direction and a brake-releasing direction. A brake cable is operatively connected between the activation member and the brake mechanism such that (a) actuation of the motor to move the activation member in the brake-applying direction applies a force to the brake cable to increase tension in the brake cable, and (b) actuation of the motor to move the activation member in the brake-releasing direction releases the force to reduce the tension in the brake cable. The actuator includes a sensing device for sensing a magnitude of the force transferred between the activation member and the brake cable. The sensing device includes a first attachment structure and a second attachment structure mounted to the first attachment structure to enable relative linear movement between the first and second attachment structures in opposing first and second directions. The first attachment structure is operatively connected to the activation member and the second attachment structure is operatively connected to the brake cable. An actuating member is provided on one of the first and second attachment structures. A biasing structure is positioned between the first and second attachment structures. The biasing structure enables the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force. A sensor includes a first switch and a second switch. Each of the first and second switches is adapted to be actuated by the actuating member. The actuating member is positioned to actuate the first switch upon reaching a predetermined maximum linear displacement between the first and second attachment structures. The actuating member is positioned to actuate the second switch upon reaching a predetermined minimum linear displacement between the first and second attachment structures. A control assembly is connected between the motor and the sensor of the sensing device. The control assembly is operable to cease rotation of the motor in the brake-applying direction upon the first switch being actuated by the actuating member and to cease rotation of the motor in the brake-releasing direction upon the second switch being actuated by the actuating member.

Yet another aspect of the invention relates to a method for sensing a magnitude of force being applied to a cable by a motor using a sensing device including a first attachment structure operatively connected to the motor and a second attachment structure operatively connected to the cable and mounted to the first attachment structure to enable relative linear movement between the first and second attachment structures. An actuating member is provided on one of the first and second attachment structures. A biasing structure is positioned between the first and second attachment structures and enables the force to be transferred from the motor and the first attachment structure to the cable and the second attachment structure through the biasing structure with the biasing structure resiliently deflecting to allow relative linear displacement between the first and second attachment structures in an amount related to the magnitude of the force. A sensor includes a first switch and a second switch. Each of the first and second switches is adapted to be actuated by the actuating member. The actuating member is positioned to actuate the first switch upon reaching a predetermined maximum linear displacement between the first and second attachment structures. The actuating member is positioned to actuate the second switch upon reaching a predetermined minimum linear displacement between the first and second attachment structures. A control assembly is connected between the motor and the sensor. The control assembly is operable to cease rotation of the motor in the brake-applying direction upon the first switch being actuated by the actuating member and to cease rotation of the motor in the brake-releasing direction upon the second switch being actuated by the actuating member. The method comprises: operating the motor to vary a force applied to the cable through the sensing device to vary tension in the cable; actuating one of the first and second switches with the actuating member; and the control assembly detecting the actuation of the switch and responsively ceasing operation of the motor.

Yet another aspect of the invention relates to a sensing device for sensing an amount of force transferred between a first element and a second element. The sensing device includes a first attachment structure and a second attachment structure mounted to the first attachment structure to enable relative linear movement between the first and second attachment structures in opposing first and second directions. The first attachment structure is configured to be operatively connected to the first element and the second attachment structure is configured to be operatively connected to the second element. A biasing structure is positioned between the first and second attachment structures. The biasing structure enables a force to be transferred from the first element and the first attachment structure to the second element and the second attachment structure through the biasing structure with the biasing structure resiliently deflecting to allow relative linear displacement between the first and second attachment structures in an amount related to a magnitude of the force. A sensor includes a potentiometer that outputs a voltage signal corresponding to a linear displacement between the first and second attachment structures. The potentiometer outputs the voltage signal. A control assembly is operable to receive the outputted voltage signal from the sensor and identify (1) a maximum voltage signal when a maximum linear displacement between the first and second attachment structures is reached, and (2) a minimum voltage signal when a minimum linear displacement between the first and second attachment structures is reached.

Other aspects, features and advantages of this invention will become apparent from the following detailed description when taken in conjunction with the accompanying drawings, which are a part of this disclosure and which illustrate, by way of example, principles of the present invention.

BRIEF DESCRIPTION OF THE DRAWINGS

The accompanying drawings facilitate an understanding of the various embodiments of this invention. In such drawings.

DETAILED DESCRIPTION OF THE ILLUSTRATED EMBODIMENT

Figure 1:
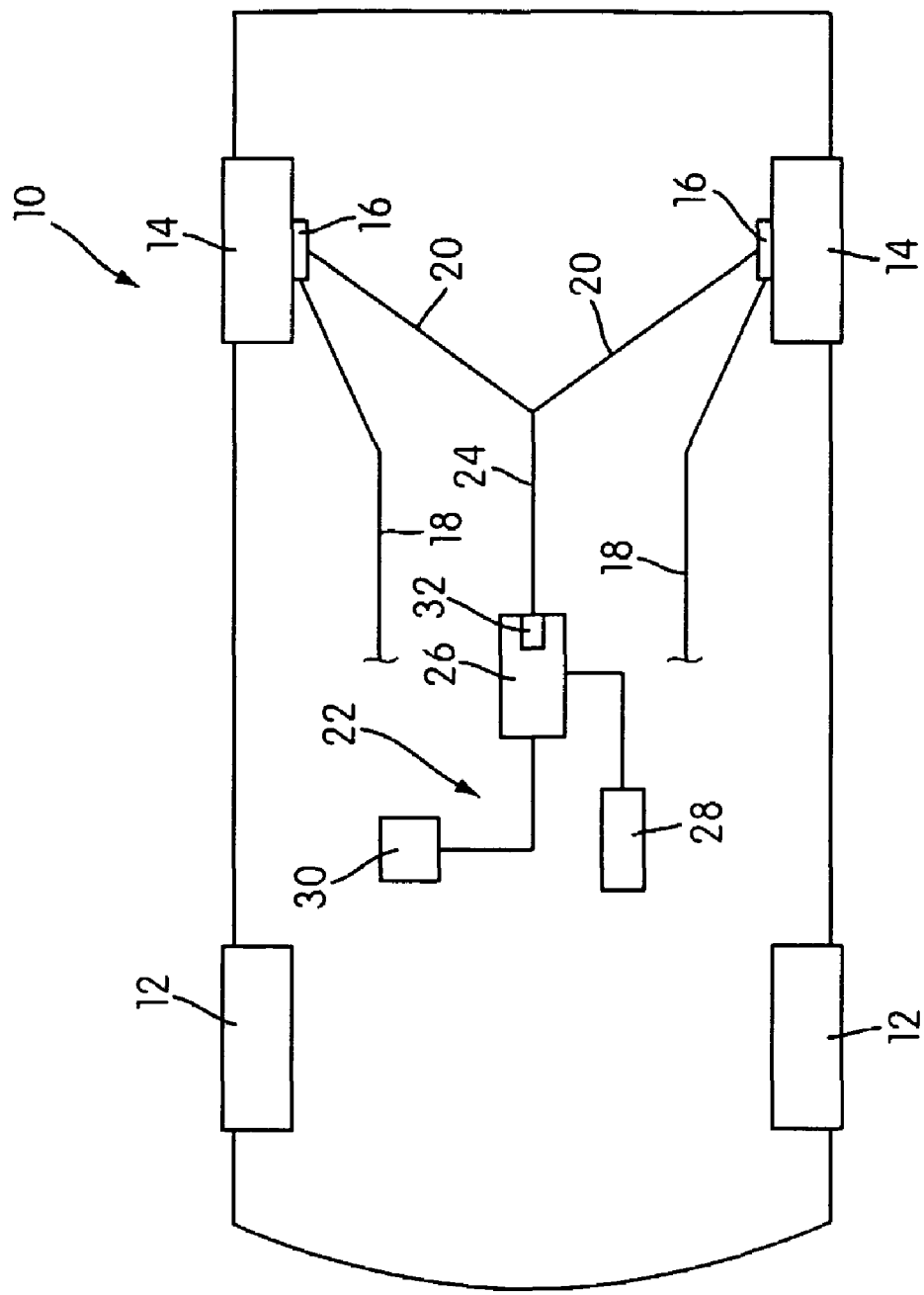
FIG. 1 is a schematic view of a vehicle illustrating the brake mechanisms and brake actuation assembly thereof.

FIG. 1 schematically illustrates a motor vehicle 10 having a pair of front wheel assemblies 12 and a pair of rear wheel assemblies 14. The rear wheel assemblies 14 each include a brake mechanism 16, which are operable to apply a braking force to the wheel assemblies 14 in order to slow and/or stop the vehicle 10 when in motion, or to prevent movement of the vehicle 10 when stopped. The brake mechanisms 16 are operable by a hydraulic brake assembly (not shown) via hydraulic lines 18, for example, when the vehicle 10 is under power. Alternatively, the brake mechanisms 16 are operable by a pair of linkages 20 coupled to a brake actuation assembly 22 via a connecting linkage 24. In the illustrated embodiment, the linkages 20, 24 are wire-strand brake cables. However, the linkages 20, 24 may be rigid linkages, such as rods.

The brake actuation assembly 22 is operable by an occupant of the vehicle 10, e.g., a driver, to pull the brake cables 20, 24 in a brake-applying direction towards a braking position wherein tension is supplied to the brake cables 20, 24 such that the brake mechanisms 16 apply the braking force to the wheel assemblies 14. Conversely, the brake actuation assembly 22 is operable by the occupant to release tension in the brake cables 20, 24 in an opposite brake-releasing direction to a released position wherein tension in the brake cables 20, 24 is reduced such that the brake mechanisms 16 release the braking force to the wheel assemblies 14.

The brake actuation assembly 22 may include an electric brake actuator 26 and a manual brake actuator 28. The electric brake actuator 26 is operable by an occupant of the vehicle 10 by an electrical control assembly 30 (e.g., a console with push-buttons or switches) to apply and release tension to the brake cables 20, 24 when the vehicle 10 is under power. The manual brake actuator 28 is manually operable by an occupant of the vehicle 10 to apply and release tension to the brake cables 20, 24 when the electric brake actuator 26 is not powered, due to a breakdown of the vehicle electrical system, for example. A cable tension sensing device 32 is positioned between the brake cable 24 and the brake actuation assembly 22 to sense the amount of tension being applied to the brake cables 20, 24 so that tension in the brake cables 20, 24 can be maintained between a predetermined minimum tension level and a predetermined maximum tension level, as will be discussed below in greater detail.

Figure 2:
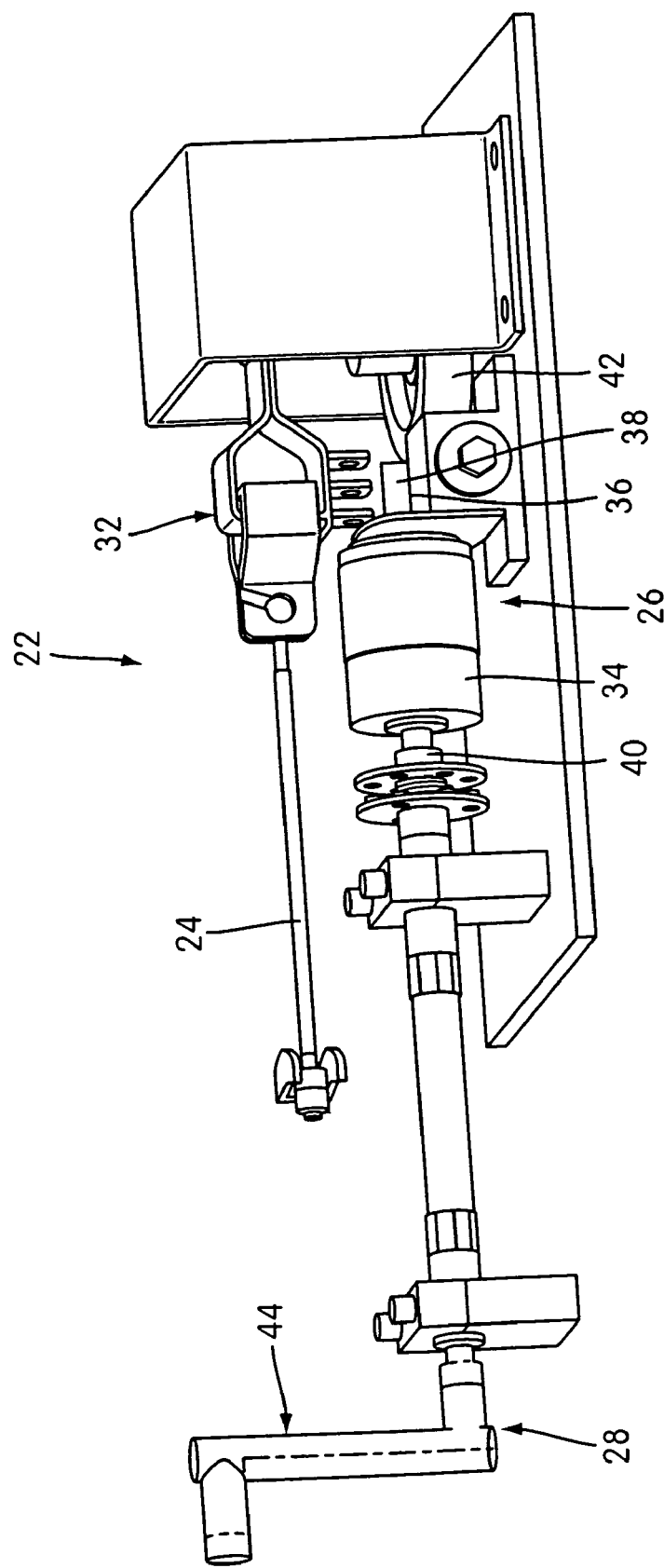
FIG. 2 is a perspective view of an embodiment of a brake actuation assembly with a cable tension sensing device constructed according to the principles of the present invention.

As shown in FIG. 2, the electric brake actuator 26 includes a reversible motor 34. The reversible motor 34 includes a driveshaft 36 having opposing end portions 38, 40. One of the end portions 38 is drivingly interconnected, through a series of gears (FIG. 2 shows one gear 42 from the series of gears), with an activation arm 43 (See FIGS. 6 and 7). The cable tension sensing device 32 is connected between the brake cable 24 and the activation arm 43. The motor 34 is selectively actuatable to rotate in a brake-applying direction to rotate the activation arm 43 so as to apply tension through the sensing device 32 to the brake cable 24 and in a brake-releasing direction opposite the brake-applying direction to rotate the activation arm 43 so as to release tension through the sensing device 32 in the brake cable 24. Further details of operation and the components of the assembly that transfers torque from the driveshaft 36 of the motor 34 to the activation arm 43 operatively connected to the brake cable 24 are disclosed in pending U.S. Patent Application to Revelis et al. entitled "Electrically Driven Parking Brake Actuation Assembly", Ser. No. 10/153,228 filed on May 23, 2002, the entirety of which is hereby incorporated by reference into the present specification. The motor 34 may be drivingly interconnected with the brake cable 24 in any other suitable manner in order to apply and release tension to the brake cable 24.

Figure 10:
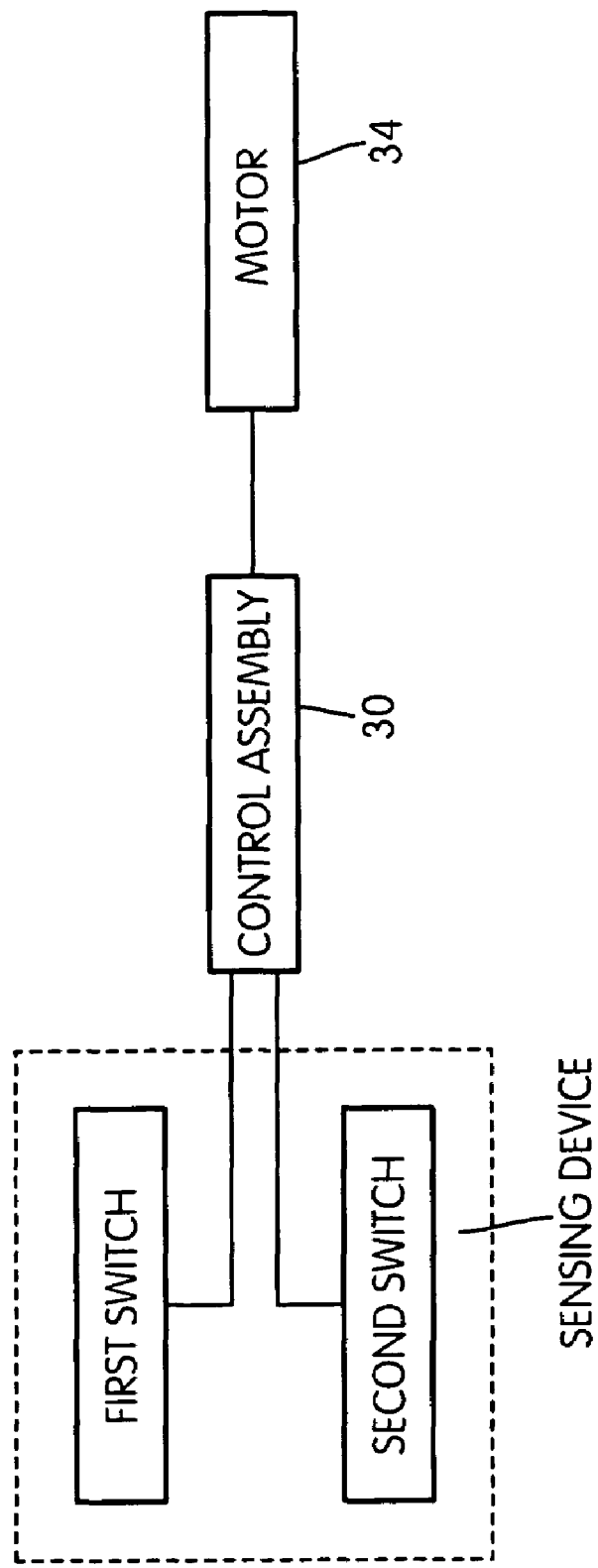
FIG. 10 is a schematic view showing the control assembly and its connections to the sensing device and the motor.

The motor 34 is connected to the electrical control assembly 30 that controls actuation of the motor 34. The electrical control assembly 30 may be connected to a manual switch within the passenger compartment that is selectively actuated to cause the control assembly 30 to operate the motor 34 in the brake-applying or brake-releasing directions. The cable tension sensing device 32 is also connected to the control assembly 30 so that the motor 34 can be shut-off when tension in the brake cables 20, 24 has reached the predetermined minimum tension level or the predetermined maximum tension level, as will be further discussed. The connections between the control assembly 30, the motor 34, and the sensing device 30 are schematically represented in FIG. 10. The manual switch may be similarly connected.

In general, the control assembly 30 is a motor controller that controls operation of the motor in the brake-applying and brake-releasing directions. The control assembly 30 may receive signals from the manual switch and/or the cable tension sensing device to cause the control assembly 30 to operate the motor in the brake-applying and brake-releasing directions. However, the control assembly 30 may also be configured for controlling operation of other vehicle assemblies.

As shown in FIG. 2, the manual brake actuator 28 includes a rotatable handle assembly 44 that is selectively moveable between engaged and disengaged positions. In the engaged position, the rotatable handle assembly 44 is engaged in rotational interlocking relationship with the end portion 40 of the driveshaft 36 of the motor 34 to manually rotate the same in the brake-applying and brake-releasing directions. In the disengaged position, the rotatable handle assembly 44 is spaced from the driveshaft 36 of the motor 34. Further details of operation and the components of the manual brake actuator 28 are disclosed in pending U.S. Patent Application to Scheuring et al. entitled "Brake Actuation Assembly for a Vehicle", Ser. No. 10/627,997 filed on Jul. 28, 2003, the entirety of which is hereby incorporated by reference into the present specification. Another embodiment of a manual brake actuator is disclosed in the incorporated U.S. Patent Application to Revelis et al.

Figure 3:
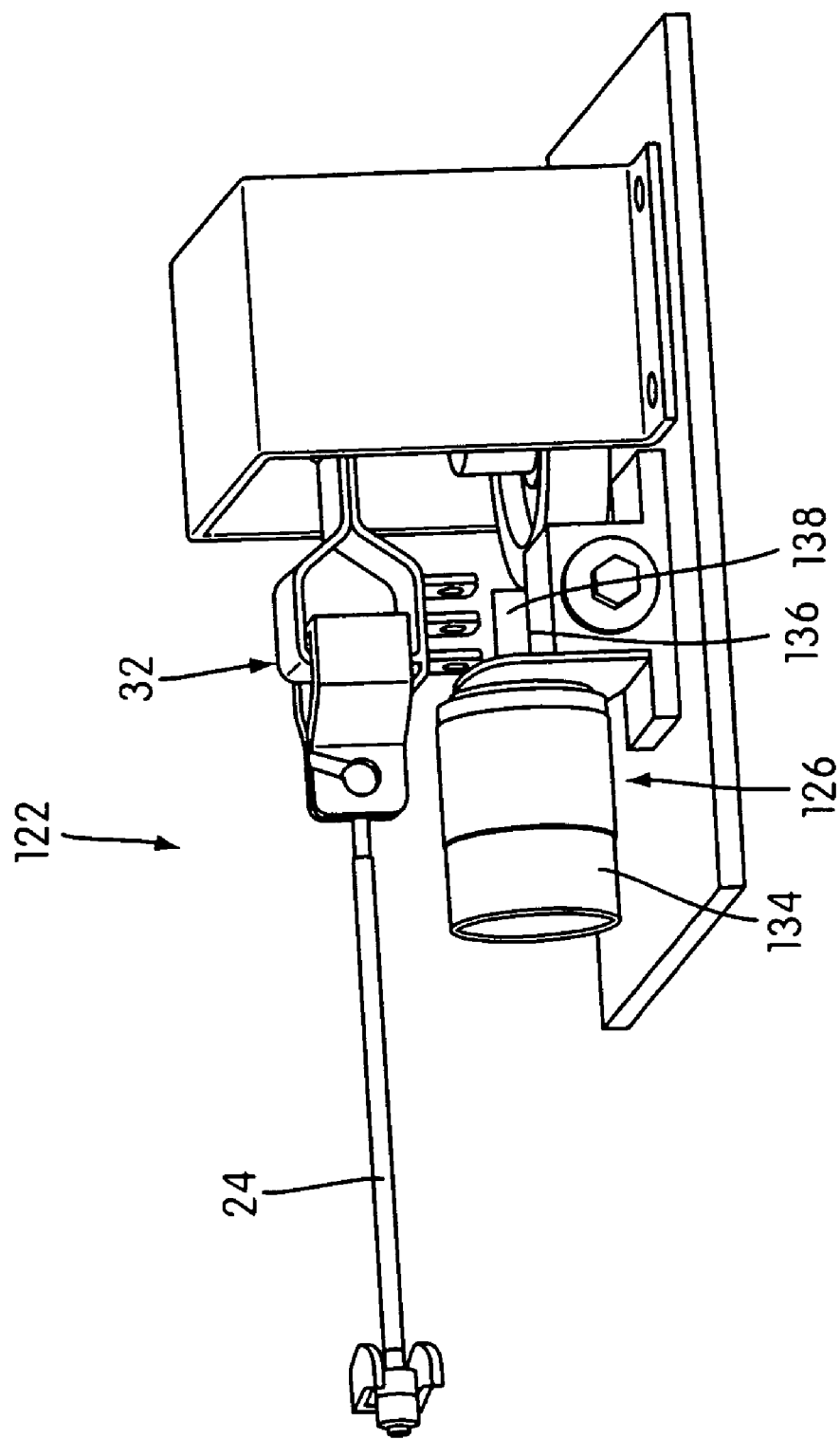
FIG. 3 is a perspective view of another embodiment of a brake actuation assembly with a cable tension sensing device constructed according to the principles of the present invention.

However, the brake actuation assembly 22 optionally may not include a manual brake actuator. As shown in FIG. 3, the brake actuation assembly 122 includes an electric brake actuator 126 having a reversible motor 134. The reversible motor 134 includes a driveshaft 136 with one end portion 138 drivingly interconnected with an activation arm. Similar to the above, the cable tension sensing device 32 is connected between the brake cable 24 and the activation arm. The motor 134 is selectively actuatable to rotate in brake-applying and brake-releasing directions to apply and release tension to the brake cable 24 through the sensing device 32.

It is also contemplated that the brake actuation assembly 22 may simply be a manual brake actuator without an electric brake actuator. The operator would manually move the manual brake actuator in brake-applying and brake-releasing directions to actuate the brake cable 24. The cable tension sensing device 32 may be connected between the brake cable 24 and an activation arm of the manual brake actuator to signal the operator (i.e., by an LED within the vehicle, for example) that tension in the brake cables 20, 24 has reached the predetermined minimum tension level or the predetermined maximum tension level. Usually, only the maximum tension level would be signaled because most manual brake actuators use a lever that stops at its fully released position, although it is conceivable that the sensing device 32 could also be used for signaling minimum cable tension.

A further understanding of the details of operation and of the components of the brake actuation assembly 22, 122 is not necessary in order to understand the principles of the present invention and thus will not be further detailed herein. Further details of operation and of the components of the brake actuation assembly 22, 122 are disclosed in the above-identified U.S. Patent Applications to Revelis et al. and Scheuring et al., the entirety of each being hereby incorporated by reference into the present specification. Instead, the present invention is concerned more specifically with the sensing device 32 and how it senses the amount of tension being applied to the brake cables 20, 24 so that tension in the brake cables 20, 24 can be maintained between a predetermined minimum tension level and a predetermined maximum tension level.

Figure 4:
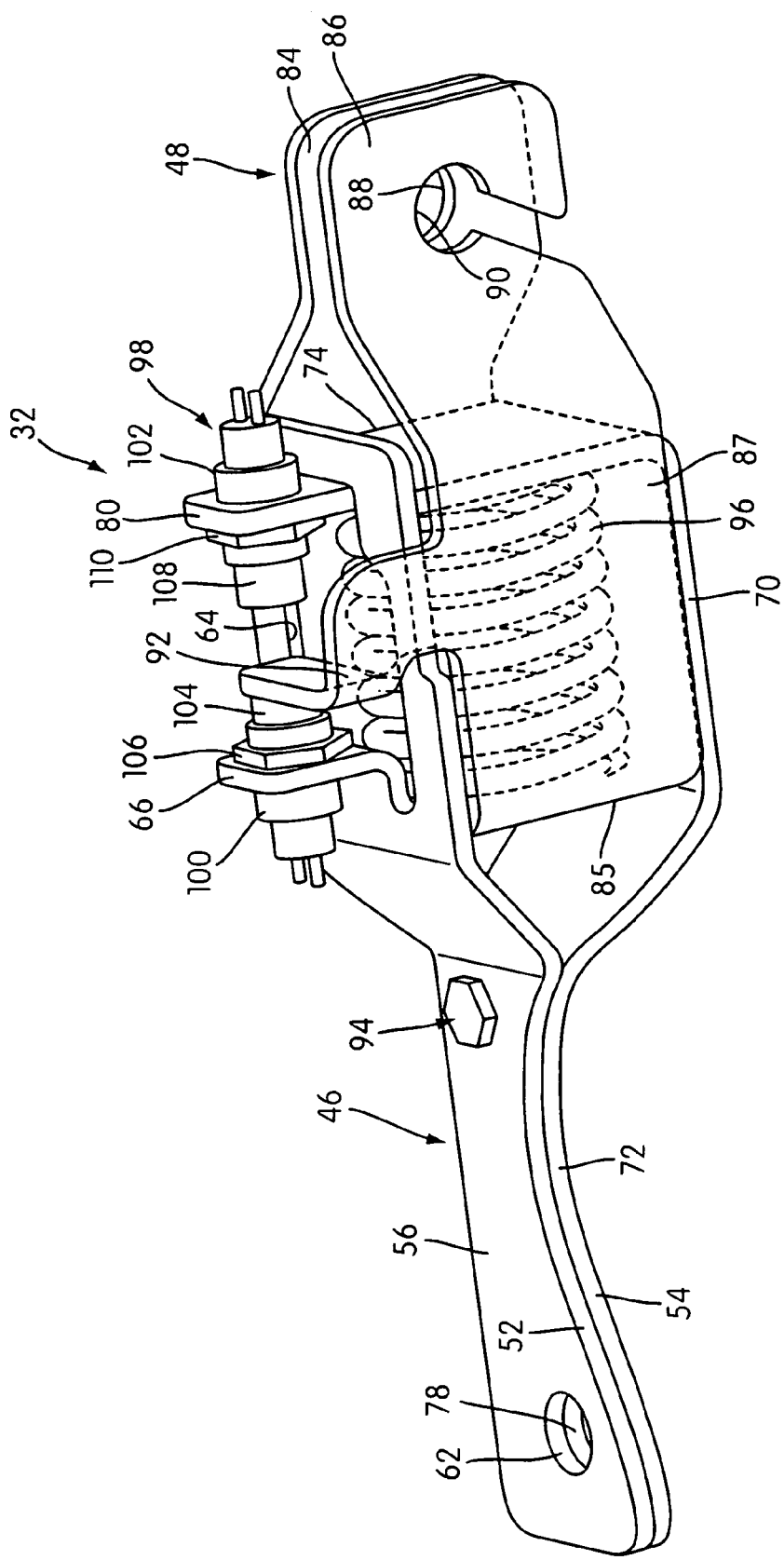
FIG. 4 is a perspective view of an embodiment of a cable tension sensing device constructed according to the principles of the present invention.

FIG. 4 illustrates a cable tension sensing device 32 for sensing the amount of tension in a cable. In the illustrated embodiment, the sensing device 32 is configured for use with a brake system of a vehicle to sense the amount of tension applied to the brake cables 20, 24. However, the sensing device 32 may be utilized in any application where it is desired to sense the amount of tension in a cable or line so that tension in the cable or line can be maintained between predetermined minimum and maximum tension levels, as will be further discussed.

As shown in FIG. 4, the sensing device 32 includes a first attachment structure 46 and a second attachment structure 48. The second attachment structure 48 is mounted to the first attachment structure 46 to enable relative linear movement between the first and second attachment structures 46, 48 along an axis 50 (See FIGS. 6 and 7) in opposing first and second directions. In the illustrated embodiment, the first attachment structure 46 is constructed and arranged to be mounted to the activation arm 43 of the electric brake actuation mechanism 26 and the second attachment structure 48 is constructed and arranged to be mounted to the brake cable 24. The first and second attachment structures 46, 48 may have any suitable construction for connection to the activation arm 43 and the brake cable 24, and the specific constructions disclosed herein are only intended to be illustrative. For example, the first attachment structure 46 may be mounted to one end of a cable with the other end of the cable mounted to the activation arm 43. Further, the first attachment structure 46 may be operatively mounted to any element associated with a mechanism that is operable to apply a tensioning force to the brake cable 24.

The attachment structures 46, 48 are referred to as "first" and "second" attachment structures simply to distinguish between the two structures. The sensing device 32 may be installed either by mounting the first attachment structure 46 to the activation arm 43 and the second attachment structure 48 to the brake cable 24 or by mounting the first attachment structure 46 to the brake cable 24 and the second attachment structure 48 to the activation arm 43. In the illustrated embodiment, the first attachment structure 46 is mountable to the activation arm 43 and the second attachment structure 48 is mountable to the brake cable 24.

Figure 5:
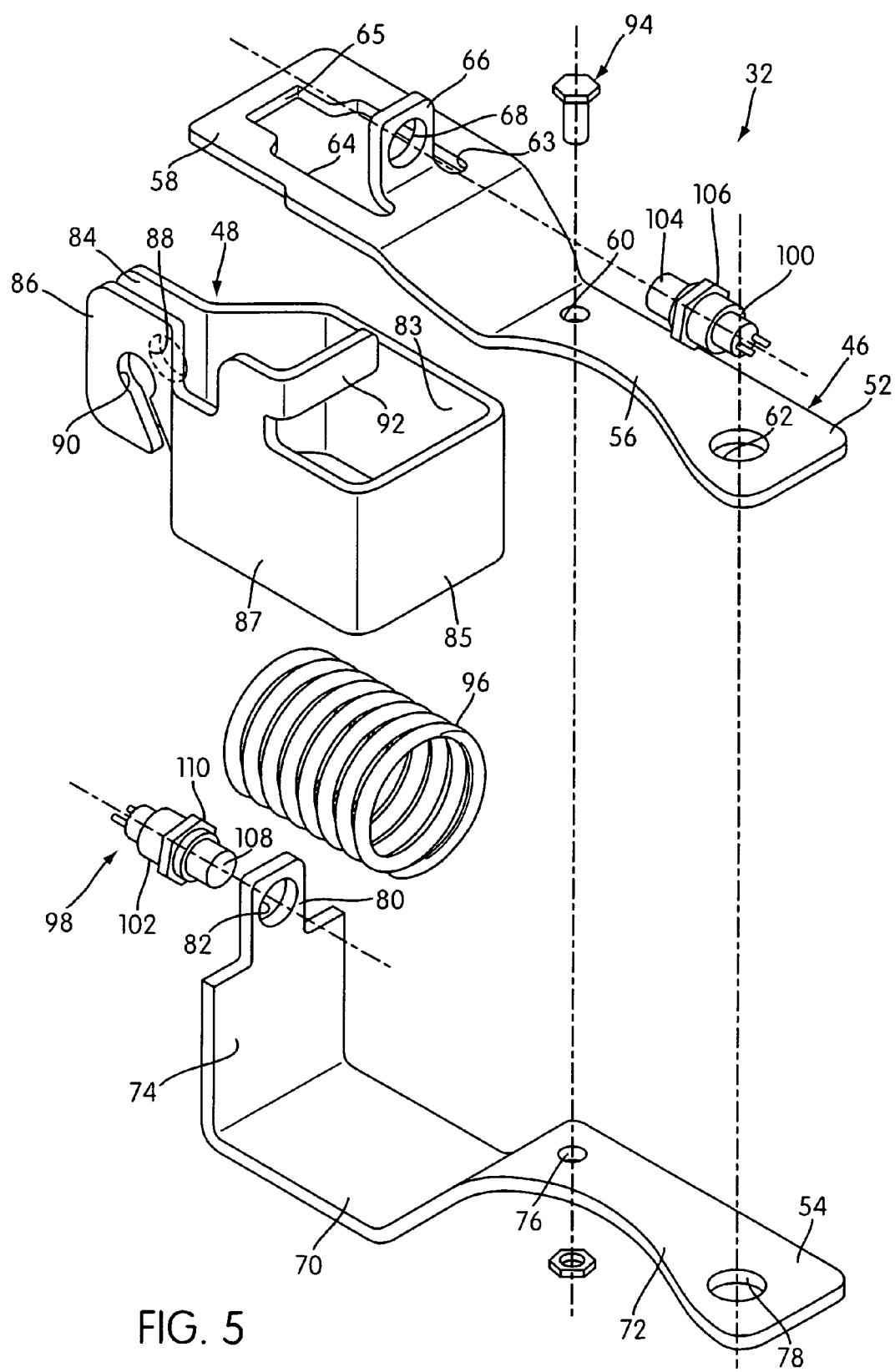
FIG. 5 is an exploded view of the cable tension sensing device shown in FIG. 4.

Referring to FIG. 5, the first attachment structure 46 includes first and second components 52, 54 that are secured to one another. Preferably, the first component 52 is stamped from a piece of sheet metal and then folded or otherwise deformed in a conventional manner to provide the first component 52 with a stepped configuration. Specifically, the first component 52 is bent such that one end 56 of the first component 52 extends in a different plane than the opposite end 58 thereof. The end 56 includes a fastener throughhole 60 and a throughhole 62 for connection to the electric brake actuator 26. The opposite end 58 includes an opening 64 therethrough. An edge 63 of the opening 64 has a tab portion 66 extending therefrom with a throughhole 68.

Preferably, the second component 54 is also stamped from a piece of sheet metal and then folded or otherwise deformed in a conventional manner to provide the second component 54 with a central portion 70, an end portion 72 that extends in a different plane than the central portion 70, and an opposite end portion 74 perpendicular to the central portion 70. The end portion 72 includes a fastener throughhole 76 and a throughhole 78 for connection to the electric brake actuator 26. The opposite end portion 74 includes a tab portion 80 with a throughhole 82.

Likewise, the second attachment structure 48 is preferably stamped from a piece of sheet metal and then folded or otherwise deformed in a conventional manner to provide the second attachment structure 48 with a generally rectangular-shaped configuration. Specifically, the second attachment structure 48 is bent to provide exterior walls 83, 85, 87 with the ends 84, 86 of the metal positioned adjacent one another. The ends 84, 86 each have throughholes 88, 90 that are aligned with one another to provide a connection to the brake cable 24. The second attachment structure 48 has a bent tab portion 92 that acts as an actuating member, as will be further discussed.

The first and second attachments structures 46, 48 may be made by any other suitable rigid material and formed by any other suitable process. For example, the first and second attachment structures 46, 48 may be molded from a rigid plastic material.

As shown in FIG. 4, the second attachment structure 48 is engaged with the second component 54 of the first attachment structure 46 such that the end portion 74 of the second component 54 extends through the interior of the rectangular-shaped second attachment structure 48. The exterior walls 83, 85, 87 of the second attachment structure 48 engage the central portion 70 of the second component 54 with the ends 84, 86 of the second attachment structure 48 extending in a direction away from the end portion 72 of the second component 54. The first component 52 of the first attachment structure 46 is then engaged with the second component 54 such that the end 56 of the first component 52 is engaged with the end portion 72 of the second component 54 with the fastener throughholes 60, 76 aligned and the throughholes 62, 78 aligned with one another. Further, the tab portion 80 of the second component 54 extends through the opening 64 of the first component 52 and is positioned adjacent the edge 65 of the opening 64 that is opposite the tab portion 66. Moreover, the throughhole 82 of the tab portion 80 is axially aligned with the throughhole 68 of the tab portion 66. The actuating member 92 extends between the tab portion 66 and the tab portion 80. The first and second components 52, 54 are secured to one another by a fastener 94. In the illustrated embodiment, the fastener 94 is a bolt that is inserted through the aligned fastener throughholes 60, 76 and secured with a nut. As a result, the second attachment structure 48 is coupled to the first attachment structure 46 and movable relative to the first attachment structure 46 along the axis 50.

Figure 6:
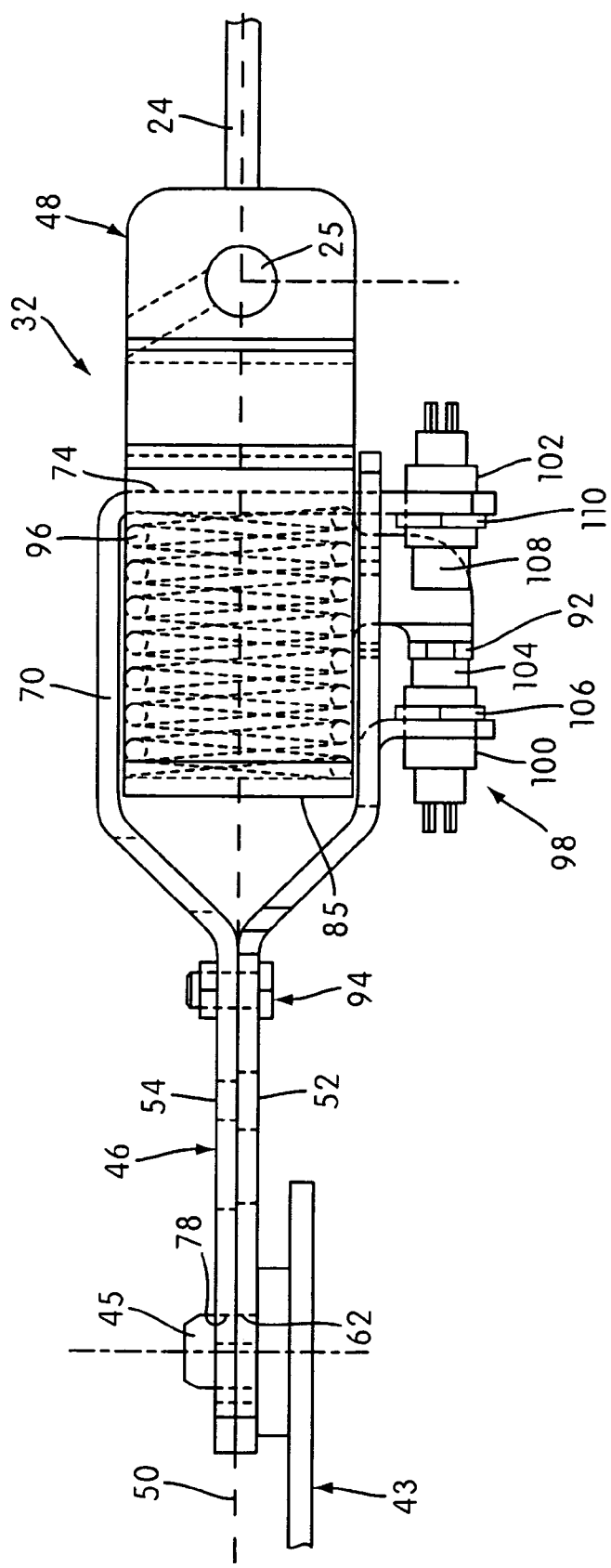
FIG. 6 is a side view of the cable tension sensing device shown in FIG. 4 in a first position.
Figure 7:
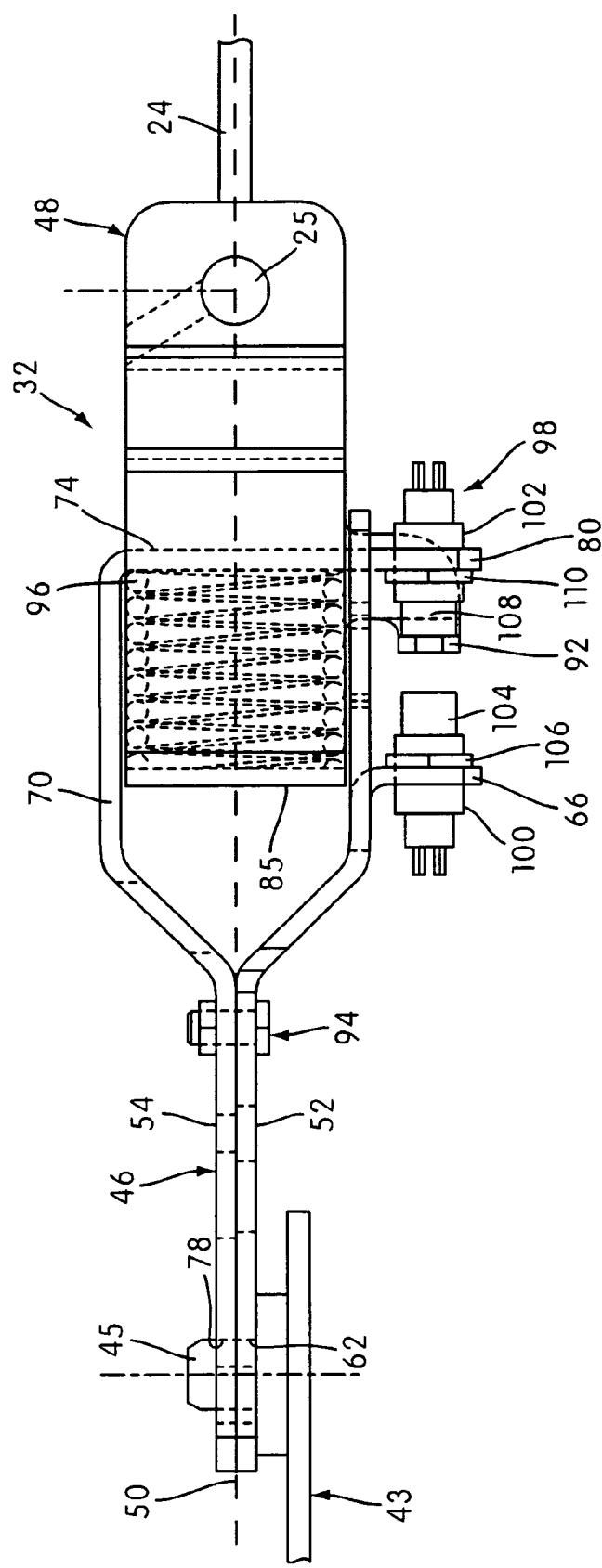
FIG. 7 is a side view of the cable tension sensing device shown in FIG. 4 in a second position.

As shown in FIGS. 6 and 7, the first attachment structure 46 is secured to the activation arm 43 and the second attachment structure 48 is secured to the brake cable 24. Specifically, the activation arm 43 has a pin 45 that is inserted through the aligned throughholes 62, 78 of the first attachment structure 46. The brake cable 24 has a retaining member 25 secured thereto that is inserted through the aligned throughholes 88, 90 of the second attachment structure 48. Thus, force is transferred from the activation arm 43 and the first attachment structure 46 to the brake cable 24 and the second attachment structure 48.

A biasing structure 96 is positioned between the first and second attachment structures 46, 48. Specifically, the biasing structure 96 has one end engaged with the end portion 74 of the second component 54 of the first attachment structure 46 and the opposite end engaged with the exterior wall 85 of the second attachment structure 48. The biasing structure 96 biases the first and second attachment structures 46, 48 apart from one another. In the illustrated embodiment, the biasing structure 96 is a compression spring. However, the biasing structure 96 may be in the form of any other suitable biasing member that can bias the attachment structures 46, 48 apart from one another. For example, the biasing structure could be a solid block of resilient material, a leaf spring, Belleville washers, or some other suitable element.

As tension is applied and released to the brake cable 24 by the activation arm 43 of the electric brake actuation mechanism 26, the relative linear movement between the first and second attachment structures 46, 48 causes corresponding linear deflection (i.e., compression) of the spring 96. Specifically, the spring 96 resists relative movement between the first and second attachment structures 46, 48 when tension is applied to the brake cable 24 and the spring 96 assists relative movement between the first and second attachment structures 46, 48 when tension is released from the brake cable 24. The amount or extent of linear displacement between the first and second attachment structures 46, 48, and hence the extent of linear deflection of the spring 96, is a function of the tension in the brake cable 24. In other words, as tension in the brake cable 24 increases, the extent of linear displacement between the first and second attachment structures 46, 48 and the extent of deflection of the spring 96 increases as well. The spring constant of the spring 96 may be modified to control the rate of linear deflection.

The sensing device 32 includes a sensor 98 adapted to output a signal based on an amount of relative linear displacement between the first and second attachment structures 46, 48. Hence, the sensor 98 outputs a signal upon indirectly sensing an amount of deflection of the spring 96. The amount of deflection of the spring 96 corresponds to the amount of force transferred between the activation arm 43 and the brake cable 24 which corresponds to the amount of tension in the cables 20, 24. As shown in FIGS. 4–7, the sensor 98 includes first and second switch units 100, 102. The first switch unit 100 is mounted within the throughhole 68 of the tab portion 66 provided on the first component 52 of the first attachment structure 46. The second switch unit 102 is mounted within the throughhole 82 of the tab portion 80 provided on the second component 54 of the first attachment structure 46. Thus, the first and second switch units 100, 102 do not move relative to one another as the first and second attachment structures 46, 48 move relative to one another.

The first switch unit 100 includes a first switch 104 and an adjusting member 106. Likewise, the second switch unit 102 includes a second switch 108 and an adjusting member 110. The first and second switch units 100, 102 are secured to respective portions of the first attachment structure 46 such that the first and second switches 104, 108 thereof face one another. The first and second switches 104, 108 are spaced a predetermined distance apart from one another. This distance can be adjusted by adjusting respective adjusting members 106, 110 of the switch units 100, 102 to move respective switches 104, 108 longitudinally in opposing first and second directions. In the illustrated embodiment, the first switch 104 occupies a position corresponding to a predetermined minimum linear deflection of the spring 96 and the second switch 108 occupies a position corresponding to a predetermined maximum linear deflection of the spring 96, as will be further discussed.

Wires (not shown) electrically connect the first and second switch units 100, 102 with the control assembly 30 that controls actuation of the motor 34 of the electric brake actuator 26. This is schematically represented in FIG. 10. The first and second switch units 100, 102 output signals to the control assembly 30, which interrupts the supply of power to the motor 34. Specifically, when the first switch 104 engages the actuating member 92 of the second attachment structure 48 during relative movement between the first and second attachment structures 46, 48, a signal is outputted to the control assembly 30 which cuts power supplied to the motor 34. As a result, the motor 34 is prevented from rotating in the brake-releasing direction to further release tension to the brake cable 24. Conversely, when the second switch 108 engages the actuating member 92 of the second attachment structure 48 during relative movement between the first and second attachment structures 46, 48, a signal is outputted to the control assembly 30 which cuts power supplied to the motor 34. As a result, the motor 34 is prevented from rotating in the brake-applying direction to further apply tension to the brake cable 24. Thus, the sensor 98 is operable to sense a position of the actuating member 92 to determine the relative linear displacement between the first and second attachment structures 46, 48.

The term "a signal is outputted" means that the first and second switch units 100, 102 are actuated such that the control assembly 30 can detect actuation of the switch units 100, 102 and responsively control operation of the motor, e.g., cease operation of the motor. For example, the signal may be provided by a flow of current in the switch units that the control assembly detects. Alternatively, the signal may be provided by a flow of current being ceased in the switch units. Thus, a signal output by the switch units includes the opening or closing of the switch units or any other action of the switch units by which another device, e.g., the control assembly, can detect actuation of the switch units.

Operation of the sensing device 32 will now be described in greater detail. FIG. 6 shows the actuating member 92 engaged with the first switch 104 of the first switch unit 100. At this position, the spring 96 has reached the predetermined minimum linear deflection which indicates that a predetermined minimum tension level in the brake cables 20, 24 has been reached. When tension in the brake cables 20, 24 is at the predetermined minimum tension level, the brake mechanisms 16 are in a released position to enable movement of the vehicle 10. Because the first switch 104 is engaged with the actuating member 92, the control assembly 30 has been signaled to prevent the motor 34 from rotating in the brake-releasing direction to further release tension to the brake cables 20, 24. Thus, tension in the brake cables 20, 24 is maintained at the predetermined minimum tension level. The motor 34 may only be actuated to rotate in the brake-applying direction to apply tension to the brake cables 20, 24.

When the motor 34 is rotated in the brake-applying direction, tension is applied to the brake cable 20, 24 which moves the first and second attachment structures 46, 48 relative to one another. During the relative movement between the first and second attachment structures 46, 48, the actuating member 92 of the second attachment structure 48 moves relative to the first and second switch units 100, 102 connected to the first attachment structure 46. Thus, when tension is applied to the brake cables 20, 24, the actuating member 92 moves away from the first switch 104 towards the second switch 108 against biasing from the spring 96. Thus, the actuating member 92 moves from a position of predetermined minimum linear deflection of the spring 96 towards a position of predetermined maximum linear deflection of the spring 96.

The motor 34 continues to rotate in the brake-applying direction until the actuating member 92 engages the second switch 108 of the second switch unit 102. At this position, the spring 96 has reached the predetermined maximum linear deflection which indicates that a predetermined maximum tension level in the brake cables 20, 24 has been reached. When tension in the brake cables 20, 24 is at the predetermined maximum tension level, the brake mechanisms 16 are in a applied position to prevent movement of the vehicle 10. Because the second switch 108 is engaged with the actuating member 92, the control assembly 30 has been signaled to prevent the motor 34 from rotating in the brake-applying direction to further apply tension to the brake cables 20, 24. Thus, tension in the brake cables 20, 24 is maintained at the predetermined maximum tension level. The motor 34 may only be actuated to rotate in the brake-releasing direction to release tension to the brake cables 20, 24.

Upon rotation of the motor 34 in the brake-releasing direction, the actuating member 92 moves away from the second switch 108 towards the first switch 104 with biasing from the spring 96 until the actuating member 92 engages the first switch 104 which interrupts the supply of power to the motor 34. Thus, the actuating member 92 engages the first switch 104 when tension in the brake cables 20, 24 is at a predetermined minimum level and the actuating member 92 engages the second switch 108 when tension in the brake cables 20, 24 is at a predetermined maximum level. The first and second switches 104, 108 can be longitudinally moved by respective adjusting members 106, 110 in order to adjust the predetermined minimum and maximum linear deflection of the spring 96. This in turn adjusts the predetermined minimum and maximum tension levels of the brake cables 20, 24, respectively. The predetermined minimum and maximum tension levels of the brake cables 20, 24 can be calibrated by applying a known cable tension and then adjusting the adjusting members 106, 110 until an appropriate switch 104, 108 is engaged with the actuating member 92.

Figure 8:
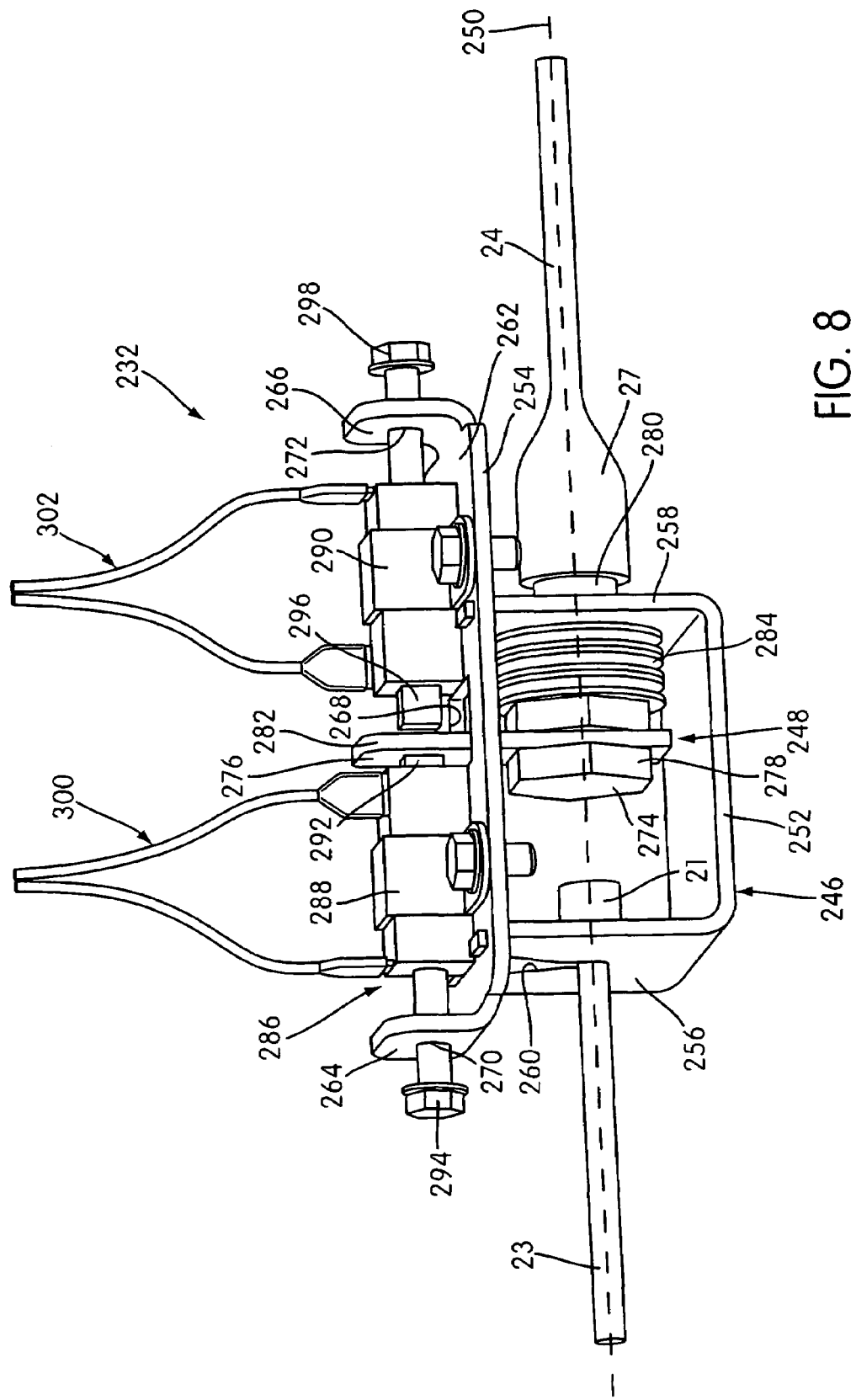
FIG. 8 is a perspective view of another embodiment of a cable tension sensing device.

A further embodiment of the sensing device, indicated as 232, is illustrated in FIG. 8. The sensing device 232 includes a first attachment structure 246 and a second attachment structure 248. The second attachment structure 248 is mounted to the first attachment structure 246 to enable relative linear movement between the first and second attachment structures 246, 248 along an axis 250 in opposing first and second directions. In the illustrated embodiment, the first attachment structure 246 is constructed and arranged to be mounted to a cable 23 that is coupled to the activation arm 43 of the electric brake actuator 26 or any other element associated with a mechanism that is operable to apply a tensioning force to the cable 23. The second attachment structure 248 is constructed and arranged to be mounted to the brake cable 24.

The first attachment structure 246 includes first and second components 252, 254 that are secured to one another. Preferably, the first component 252 is stamped from a piece of sheet metal and then folded or otherwise deformed in a conventional manner to provide the first component 252 with a pair of generally parallel opposing retaining walls 256, 258. The retaining wall 256 has an opening 260 formed therethrough for connection to the cable 23. The retaining wall 258 has an opening (not shown) formed therethrough to enable the second attachment structure 248 to connect to the cable 24, as will be further discussed.

Preferably, the second component 254 is also stamped from a piece of sheet metal and then folded or otherwise deformed in a conventional manner to provide the second component 254 with a central wall 262 and opposite end portions 264, 266 perpendicular to the central portion 262. The central wall 262 has an opening 268 therethrough and the end portions 264, 266 have respective throughholes 270, 272.

The first attachment structure 246 may be made by any other suitable rigid material and formed by any other suitable process. For example, the first attachment structure 246 may be molded from a rigid plastic material.

The second attachment structure 248 includes a fastening structure 274 with an elongated actuating member 276 secured thereto. Specifically, the fastening structure 274 is in the form of a bolt having a head 278 and a threaded shank 280. One end of the actuating member 276 is secured to the head 278 of the bolt 274 in any suitable manner.

As illustrated, the second attachment structure 248 is engaged with the first attachment structure 246 such that the end 282 of the actuating member 276 extends through the opening 268 in the second component 254 and the shank 280 of the bolt 274 extends through the opening of the retaining wall 258 of the first component 252.

The cable 23 has a retaining member 21 secured thereon that secures the cable 23 to the retaining wall 256 of the first attachment structure 246. Specifically, the cable 23 extends through the opening 260 of the retaining wall 256 with the retaining member 21 positioned adjacent the inner surface of the retaining wall 256. The retaining member 21 has a larger dimension than the dimension of the opening 260 to prevent withdrawal of the cable 23 from the retaining wall 256. The cable 23 may be secured to the retaining wall 256 by any other suitable method to prevent withdrawal therefrom.

The end of the brake cable 24 has a threaded portion 27 that is configured to threadably engage the threaded shank 280 of the bolt 274. Specifically, the threaded shank 280 of the bolt 274 extends through the opening in the retaining wall 258 such that the head 278 of the bolt 274 is adjacent the inner surface of the retaining wall 258. The threaded shank 280 is threadably engaged with the threaded portion 27 of the brake cable 24 to secure the brake cable 24 to the second attachment structure 248. The head 278 of the bolt 274 has a larger dimension than the dimension of the opening to prevent withdrawal of the bolt 274 and hence separation of the brake cable 24 from the second attachment structures 248. Thus, tension applied by the cable 23 from the activation arm is transferred to the brake cable 24 through the first and second attachment structures 246, 248.

A biasing structure 284 is positioned between the first and second attachment structures 246, 248. Specifically, the biasing structure 284 has one end engaged with the retaining wall 258 of the first attachment structure 246 and the opposite end engaged with the head 278 of the bolt 274 of the second attachment structure 248. The biasing structure 284 biases the first and second attachment structures 246, 248 apart from one another. In the illustrated embodiment, the biasing structure 284 is a set of wave washers. However, the biasing structure 284 may be in the form of any other suitable biasing member that can bias the attachment structures 246, 248 apart from one another.

Similar to the above-described embodiment, as tension is applied to and released from the cables 20, 23, 24, the relative linear movement between the first and second attachment structures 246, 248 causes corresponding linear deflection of the wave washers 284. The extent of linear deflection of the wave washers 284 is a function of the tension in the cables 20, 23, 24.

The sensing device 232 includes a sensor 286 adapted to output a signal based on an amount of relative linear displacement between the first and second attachment structures 246, 248 and hence an amount of deflection of the wave washers 284. The sensor 286 includes first and second switch units 288, 290. The first and second switch units 288, 290 are secured to the central wall 262 such that the first and second switch units 288, 290 are positioned on opposite ends of the opening 268 adjacent the end portions 264, 266. Thus, the first and second switch units 288, 290 do not move relative to one another as the first and second attachment structures 246, 248 move relative to one another.

The first switch unit 288 includes a first switch 292 and an adjusting member 294. Likewise, the second switch unit 290 includes a second switch 296 and an adjusting member 298. The first and second switch units 288, 290 are secured to central wall 262 such that the first and second switches 292, 296 thereof face one another. The first and second switches 292, 296 are spaced a predetermined distance apart from one another. This distance can be adjusted by adjusting respective adjusting members 294, 298 of the switch units 288, 290. In the illustrated embodiment, the adjusting members 294, 298 are in the form of bolts. The bolts 294, 298 are supported by the end portions 264, 266 and are operatively engaged with respective switches 292, 296. The bolts 294, 298 are adjustable to move respective switches 292, 296 longitudinally in opposing first and second directions. In the illustrated embodiment, the first switch 292 occupies a position corresponding to a predetermined minimum linear deflection of the wave washers 284 and the second switch 296 occupies a position corresponding to a predetermined maximum linear deflection of the wave washers 284.

Wires 300, 302 electrically connect the first and second switch units 288, 290, respectively, with the control assembly 30 that controls actuation of the motor 34 of the electric brake actuator 26. Similar to the above-described embodiment, the first and second switch units 288, 290 provide signals to the control assembly 30, which interrupts the supply of power to the motor 34. Specifically, when the actuating member 276 of the second attachment structure 248 engages either one of the first and second switches 292, 296 during relative movement between the first and second attachment structures 246, 248, a signal is outputted to the control assembly 30 which cuts power supplied to the motor 34 to prevent further rotation of the motor 34 in either the brake-releasing or brake-applying direction.

Operation of the sensing device 232 is similar to the operation of the sensing device 32 described above. Specifically, FIG. 8 shows the actuating member 276 engaged with the first switch 292 indicating that the wave washers 284 have reached the predetermined minimum linear deflection which indicates that a predetermined minimum tension level in the cables 20, 23, 24 has been reached. When the motor 34 is rotated in the brake-applying direction, tension is applied to the brake cables 20, 23, 24 which moves the actuating member 276 of the second attachment structure 248 away from the first switch 292 towards the second switch 296 against biasing from the wave washers 284. The motor 34 continues to rotate in the brake-applying direction until the actuating member 276 engages the second switch 296 indicating that the wave washers 284 have reached a predetermined maximum linear deflection which indicates that a predetermined maximum tension level in the cables 20, 23, 24 has been reached. Thus, the actuating member 276 engages the first switch 292 when tension in the cables 20, 23, 24 is at a predetermined minimum level and the actuating member 276 engages the second switch 296 when tension in the cables 20, 23, 24 is at a predetermined maximum level. The first and second switches 292, 296 can be longitudinally moved by respective adjusting members 294, 298 in order to adjust the predetermined minimum and maximum linear deflection of the wave washers 284 which in turn adjusts the predetermined minimum and maximum tension levels of the cables 20, 23, 24, respectively.

Figure 9:
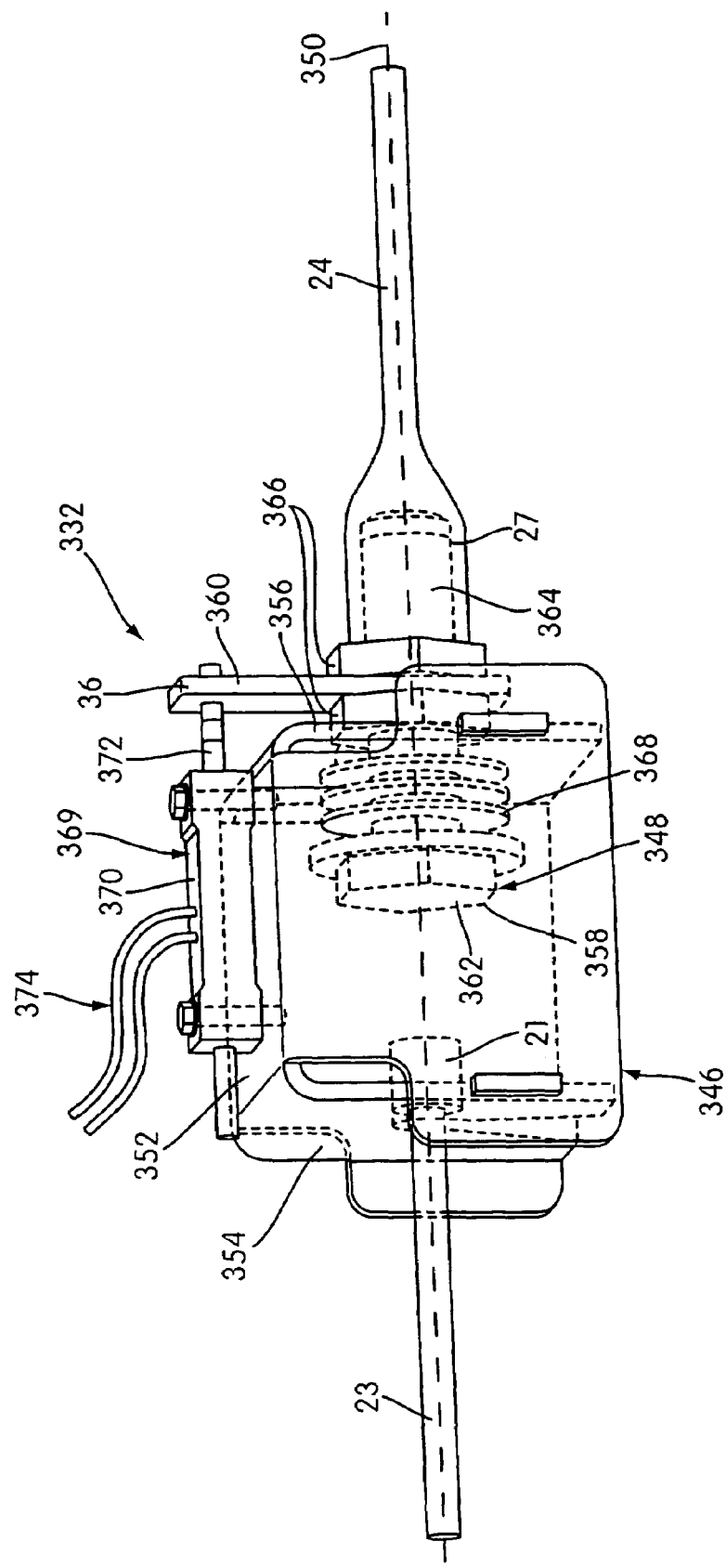
FIG. 9 is a perspective view of still another embodiment of a cable tension sensing tab device.

A further embodiment of the sensing device, indicated as 332, is illustrated in FIG. 9. The sensing device 332 includes a first attachment structure 346 and a second attachment structure 348 mounted to the first attachment structure 346 to enable relative linear movement between the first and second attachment structures 346, 348 along an axis 350 in opposing first and second directions. In the illustrated embodiment, the first attachment structure 346 is constructed and arranged to be mounted to a cable 23 that is coupled to the activation arm 43 of the electric brake actuator 26 or any other element associated with a mechanism that is operable to apply a tensioning force to the cable 23. The second attachment structure 348 is constructed and arranged to be mounted to the brake cable 24.

The first attachment structure 346 includes an upper wall 352 and a pair of generally parallel opposing retaining walls 354, 356. The retaining walls 354, 356 each have an opening formed therethrough to enable connection to the cables 23, 24, respectively.

The second attachment structure 348 includes a fastening structure 358 with an elongated actuating member 360 secured thereto. Specifically, the fastening structure 358 is in the form of a bolt having a head 362 and a threaded shank 364. One end of the actuating member 360 is secured to an intermediate portion of the shank 364 of the bolt 358 in any suitable manner. In the illustrated embodiment, a pair of nuts 366 secure the actuating member 360 to the intermediate portion of the shank 364 of the bolt 358.

As illustrated, the second attachment structure 348 is engaged with the first attachment structure 346 such that the shank 364 of the bolt 358 extends through the opening of the retaining wall 356 of the first attachment structure 346 and the end 367 of the actuating member 360 extends upwardly towards the upper wall 352 of the first attachment structure 346.

Similar to the embodiment of sensing device 232, the cable 23 has a retaining member 21 secured thereon that secures the cable 23 to the retaining wall 354 of the first attachment structure 346 and the end of the brake cable 24 has a threaded portion 27 that is configured to threadably engage the threaded shank 364 of the bolt 358. Thus, tension applied by the cable 23 from the activation arm is transferred to the brake cable 24 through the first and second attachment structures 346, 348.

A biasing structure 368 is positioned between the retaining wall 356 of the first attachment structure 346 and the head 362 of the bolt 358 of the second attachment structure 348. The biasing structure 368 biases the first and second attachment structures 346, 348 apart from one another. In the illustrated embodiment, the biasing structure 368 is a set of wave washers. However, the biasing structure 368 may be in the form of any other suitable biasing member that can bias the attachment structures 346, 348 apart from one another.

Similar to the above-described embodiments, as tension is applied to and released from the cables 20, 23, 24, the relative linear movement between the first and second attachment structures 346, 348 causes corresponding linear deflection of the wave washers 368. The extent of linear deflection of the wave washers 368 is a function of the tension in the cables 20, 23, 24.

The sensing device 332 includes a sensor 369. The sensor 369 includes a linear potentiometer 370 that has a movable shaft 372 secured to the actuating member 360. Thus, relative linear movement between the first and second attachment structures 346, 348 causes corresponding linear movement of the shaft 372. The potentiometer 370 is electrically coupled to the shaft 373 such that the potentiometer 370 outputs a voltage signal corresponding to the linear displacement of the shaft 372. Hence, the potentiometer 370 outputs a voltage signal corresponding to a linear deflection of the wave washers 368.

The sensor 369 may be a rotary potentiometer or any other suitable structure capable of converting the deflection of the wave washers 368 or relative movement between the first and second attachment structures 346, 348 into a voltage signal.

Wires 374 electrically connect the potentiometer 370 with the control assembly 30 that controls actuation of the motor 34 of the electric brake actuator 26. The potentiometer 370 outputs the voltage signal to the control assembly 30 that identifies a minimum voltage signal when the wave washers 368 reach a minimum linear deflection and a maximum voltage signal when the wave washers 368 reach a maximum linear deflection. Similar to the above-described embodiments, the minimum linear deflection of the wave washers 368 indicates that a minimum tension level in the cables 20, 23, 24 has been reached and the maximum linear deflection of the wave washers 368 indicates that a maximum tension level in the cables 20, 23, 24 has been reached. Thus, the control assembly 30 interrupts the supply of power to the motor 34 when the minimum or maximum voltage signal is identified so as to prevent further rotation of the motor 34 in either the brake-releasing or brake-applying direction.

The control assembly 30 constantly adjusts the maximum voltage signal and the minimum voltage signal in accordance with signals received from one or more vehicle sensors that monitor various vehicle conditions that can affect the amount of tension required to prevent the vehicle from moving. Specifically, the vehicle sensors may monitor the angle at which the vehicle sits, weather conditions, and the weight of the vehicle which depends on the payload in the vehicle. Depending on the signals received from these vehicle sensors, the control assembly 30 adjusts the maximum voltage signal and the minimum voltage signal. As a result, the amount of deflection of the wave washers 368 or relative movement between the first and second attachment structures 346, 348 changes.

For example, the sensor 369 may include an incline sensor that outputs an incline signal to the control assembly 30 corresponding to angle at which the vehicle sits. The control assembly 30 adjusts the maximum voltage signal and the minimum voltage signal based on the incline signal received from the incline sensor. Thus, the maximum voltage signal would be higher for a vehicle sitting on a steep hill than a vehicle sitting on a flat surface because a greater tension in the brake cables is required to prevent a vehicle from moving on a steep hill than to prevent a vehicle from moving on a flat surface.

Operation of the sensing device 332 will now be described in greater detail. When the motor 34 is rotated in the brake-applying direction, tension is applied to the brake cables 20, 23, 24 which moves the actuating member 360 and the shaft 372 away from the potentiometer 370 against biasing from the wave washers 368. The motor 34 continues to rotate in the brake-applying direction until the control assembly 30 identifies the maximum voltage signal which indicates that a maximum tension level in the cables 20, 23, 24 has been reached. Likewise, when the motor 34 is rotated in the brake-releasing direction, tension is released from the brake cables 20, 23, 24 which moves the actuating member 360 and the shaft 372 towards the potentiometer 370 with biasing from the wave washers 368. The motor 34 continues to rotate in the brake-releasing direction until the control assembly 30 identifies the minimum voltage signal which indicates that a minimum tension level in the cables 20, 23, 24 has been reached. The control assembly 30 may constantly adjust the maximum voltage signal and the minimum voltage signal based on signals received from other sensors monitoring vehicle conditions (i.e., the incline signal received from the incline sensor). The minimum and maximum voltage signals may also be adjusted manually.

Thus, the sensing device 32, 232, 332 maintains the amount of tension in cables between minimum and maximum tension levels. The sensing device 32, 232, 332 is adjustable such that the minimum and maximum tension levels can be adjusted to accommodate cable wear, tensioning requirements for specific vehicles, and vehicle conditions (i.e., vehicle incline and payload in the vehicle, for example). Moreover, the sensing device 32, 232, 332 provides feedback to diagnose problems in the parking brake system when proper cable tension in either the applied or released state cannot be attained.

It is contemplated that the sensing device 32, 232 may include only one switch unit. For example, the sensing device 32, 232 may be provided with a switch unit to indicate a maximum tension level. Thus, as tension is applied, the control assembly 30 will cut power to the motor 34 when tension in the cables reaches a maximum tension level. However, when tension is released, there is no indication that a minimum tension level has been reached.

The sensing device may be utilized in any application where it is desired to maintain tension in a cable or line between minimum and maximum tension levels. An example is a sensing device for a semi-automatic fishing reel. Them maximum tension level could be set to the optimum level for a given line (i.e., set to 4 lbs. when using 8 lb. test line). The sensing device could send a signal to an actuator in the reel which would disengage the reel from taking up more line. When the tension dropped below this maximum tension level, the reel would be re-engaged to allow line to be taken up. The minimum tension level could be used to send a signal when a fish is possibly on the line, when a fish is biting (when trolling), or when the lure's motion is being otherwise impeded.

Another example is sensing device for a low cost go/no-go weight gauge. The sensing device could be calibrated for different weight limits and provide a signal to an indicator (such as a light bulb) when the limit is reached. Examples of this could be for sorting out produce which must meet certain weight requirements, sorting out fish which can be kept or must be released (for conservation laws in sport fishing), or signaling when containers are filled to the proper amount.

Yet another example is a sensing device for an emergency towing indicator. When towing a trailer with a vehicle, the sensing device could be attached in-line to the safety line. If the main load-bearing members were to fail, the safety line would take over and immediately signal to the driver when the maximum tension level was reached.

Still another example is a sensing device for a machinery emergency stop switch. The sensing device could be used to control relays which shut off power to machinery or a conveyor in manufacturing settings. Pull-cords which would be accessible to operators anywhere on the manufacturing line would be attached to the sensing device and the maximum tension level would be exceeded when the emergency rope was pulled.

It can thus be appreciated that the objectives of the present invention have been fully and effectively accomplished. The foregoing specific embodiments have been provided to illustrate the structural and functional principles of the present invention, and are not intended to be limiting. To the contrary, the present invention is intended to encompass all modifications, alterations and substitutions within the spirit and the scope of the appended claims.

What is claimed is:

1. A brake actuator for actuating a brake mechanism of a vehicle to apply and release a braking force to and from a wheel assembly of the vehicle, the actuator comprising:
   a reversible motor;
   an activation member operatively connected to the motor, the motor being selectively actuatable to move the activation member in a brake-applying direction and a brake-releasing direction;
   a brake cable operatively connected between the activation member and the brake mechanism of the vehicle such that (a) actuation of the motor to move the activation member in the brake-applying direction applies a force to the brake cable to increase tension in the brake cable, and (b) actuation of the motor to move the activation member in the brake-releasing direction releases the force to reduce the tension in the brake cable;
   a sensing device for sensing a magnitude of the force transferred between the activation member and the brake cable, the sensing device comprising:
   a first attachment structure;
   a second attachment structure mounted to the first attachment structure to enable relative linear movement between the first and second attachment structures in opposing first and second directions, the first attachment structure being operatively connected to the activation member and the second attachment structure being operatively connected to the brake cable;
   an actuating member provided on one of the first and second attachment structures;
   a biasing structure positioned between the first and second attachment structures, the biasing structure enabling the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force; and
   a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures, the predetermined maximum displacement corresponding to an amount of the force sufficient to fully apply the vehicle's brake mechanism and the predetermined minimum displacement corresponding to an amount of the force sufficient to fully release the vehicle's brake mechanism; and
   a control assembly connected between the motor and the sensor of the sensing device, the control assembly being operable to cease rotation of the motor in the brake-applying direction upon the first switch being actuated by the actuating member and to cease rotation of the motor in the brake-releasing direction upon the second switch being actuated by the actuating member.

2. The brake actuator according to claim 1, wherein the first attachment structure moves relative to the second attachment structure against biasing of the biasing structure upon the activation member being moved to increase tension in the cable, and the first attachment structure moves relative to the second attachment structure with biasing of the biasing structure upon the activation member being moved to release tension from the cable.

3. The brake actuator according to claim 1, wherein the biasing structure is a spring.

4. The brake actuator according to claim 1, wherein the biasing structure is a set of wave washers.

5. The brake actuator according to claim 1, wherein the biasing structure is a set of Belleville washers.

6. A vehicle comprising:
   a wheel assembly;
   a brake mechanism mounted to the wheel assembly, the brake mechanism operable to apply a braking force to the wheel assembly and to release the braking force;
   a brake actuator for actuating the brake mechanism of the wheel assembly, the brake actuator comprising:
   a reversible motor;
   an activation member operatively connected to the motor, the motor being selectively actuatable to move the activation member in a brake-applying direction and a brake-releasing direction;
   a brake cable operatively connected between the activation member and the brake mechanism such that (a) actuation of the motor to move the activation member in the brake-applying direction applies a force to the brake cable to increase tension in the brake cable, and (b) actuation of the motor to move the activation member in the brake-releasing direction releases the force to reduce the tension in the brake cable;
   a sensing device for sensing a magnitude of the force transferred between the activation member and the brake cable, the sensing device comprising:
   a first attachment structure;
   a second attachment structure mounted to the first attachment structure to enable relative linear movement between the first and second attachment structures in opposing first and second directions, the first attachment structure being operatively connected to the activation member and the second attachment structure being operatively connected to the brake cable;
   an actuating member provided on one of the first and second attachment structures;
   a biasing structure positioned between the first and second attachment structures, the biasing structure enabling the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force; and
   a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures, the predetermined maximum displacement corresponding to an amount of force sufficient to fully apply the brake mechanism and the predetermined minimum displacement corresponding to an amount of force sufficient to fully release the brake mechanism; and a control assembly connected between the motor and the sensor of the sensing device, the control assembly being operable to cease rotation of the motor in the brake-applying direction upon the first switch being actuated by the actuating member and to cease rotation of the motor in the brake-releasing direction upon the second switch being actuated by the actuating member.

7. The vehicle according to claim 6, wherein the first attachment structure moves relative to the second attachment structure against biasing of the biasing structure upon the activation member being moved to increase tension in the cable, and the first attachment structure moves relative to the second attachment structure with biasing of the biasing structure upon the activation member being moved to release tension from the cable.

8. The vehicle according to claim 6, wherein the biasing structure is a spring.

9. The vehicle according to claim 6, wherein the biasing structure is a set of wave washers.

10. The vehicle according to claim 6, wherein the biasing structure is a set of Belleville washers.

11. The vehicle according to claim 6, wherein the wheel assembly is a rear wheel assembly.

12. A method for sensing a magnitude of force being applied to a brake cable by a motor using a sensing device, the brake cable being operatively connected to a brake mechanism of a vehicle for applying and releasing a braking force to and from a wheel assembly of the vehicle, the sensing device comprising (a) a first attachment structure operatively connected to the motor, (b) a second attachment structure operatively connected to the brake cable and mounted to the first attachment structure to enable relative linear movement between the first and second attachment structures, (c) an actuating member provided on one of the first and second attachment structures, (d) a biasing structure positioned between the first and second attachment structures and enabling the force to be transferred from the motor and the first attachment structure to the brake cable and the second attachment structure through the biasing structure with the biasing structure resiliently deflecting to allow relative linear displacement between the first and second attachment structures in an amount related to the magnitude of the force, (e) a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures, the predetermined maximum displacement corresponding to an amount of force sufficient to fully apply the brake mechanism and the predetermined minimum displacement corresponding to an amount of force sufficient to fully release the brake mechanism and (f) a control assembly connected between the motor and the sensor, the control assembly being operable to cease rotation of the motor in the brake-applying direction upon the first switch being actuated by the actuating member and to cease rotation of the motor in the brake-releasing direction upon the second switch being actuated by the actuating member, the method comprising:

operating the motor to vary a force applied to the cable through the sensing device to vary tension in the cable;

actuating with the actuating member one of the first switch upon the first and second attachment structures reaching the predetermined maximum displacement and the second switch upon the first and second attachment structures reaching the predetermined minimum displacement; and the control assembly detecting the actuation of the actuated switch and responsively ceasing operation of the motor.

13. A brake actuator for actuating a brake mechanism of a vehicle to apply and release a braking force to and from a wheel assembly of the vehicle, the actuator comprising:

an activation member selectively actuatable to move in a brake-applying direction and a brake-releasing direction;

a brake cable operatively connected between the activation member and the brake mechanism of the vehicle such that (a) movement of the activation member in the brake-applying direction applies a force to the brake cable to increase tension in the brake cable, and (b) movement of the activation member in the brake-releasing direction releases the force to reduce the tension in the brake cable;

a sensing device for sensing a magnitude of the force transferred between the activation member and the brake cable, the sensing device comprising:

a first attachment structure;

a second attachment structure mounted to the first attachment structure to enable relative linear movement between the first and second attachment structures in opposing first and second directions, the first attachment structure being operatively connected to the activation member and the second attachment structure being operatively connected to the brake cable;

an actuating member provided on one of the first and second attachment structures;

a biasing structure positioned between the first and second attachment structures, the biasing structure enabling the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force, the predetermined maximum displacement corresponding to an amount of the force sufficient to fully apply the vehicle's brake mechanism and the predetermined minimum displacement corresponding to an amount of the force sufficient to fully release the vehicle's brake mechanism; and a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures; and a signal responsive device connected to the sensor of the sensing device, the signal responsive device being operable responsive to actuation of the first and second switches by the actuating member.

14. A vehicle comprising:

a wheel assembly;

a brake mechanism mounted to the wheel assembly, the brake mechanism operable to apply a braking force to the wheel assembly and to release the braking force;

a brake actuator for actuating the brake mechanism of the wheel assembly, the brake actuator comprising:

an activation member selectively actuatable to move in a brake-applying direction and a brake-releasing direction;

a brake cable operatively connected between the activation member and the brake mechanism such that (a) movement of the activation member in the brake-applying direction applies a force to the brake cable to increase tension in the brake cable, and (b) movement of the activation member in the brake-releasing direction releases the force to reduce the tension in the brake cable;

a sensing device for sensing a magnitude of the force transferred between the activation member and the brake cable, the sensing device comprising:

a first attachment structure;

a second attachment structure mounted to the first attachment structure to enable relative linear movement between the first and second attachment structures in opposing first and second directions, the first attachment structure being operatively connected to the activation member and the second attachment structure being operatively connected to the brake cable;

an actuating member provided on one of the first and second attachment structures;

a biasing structure positioned between the first and second attachment structures, the biasing structure enabling the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force; and a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures, the predetermined maximum displacement corresponding to an amount of force sufficient to fully apply the brake mechanism and the predetermined minimum displacement corresponding to an amount of force sufficient to fully release the brake mechanism; and a signal responsive device connected to the sensor of the sensing device, the signal responsive device being operable responsive to actuation of the first and second switches by the actuating member.

15. A method for sensing a magnitude of force being applied to a brake cable by an activation member using a sensing device, the brake cable being operatively connected to a brake mechanism of a vehicle for applying and releasing a braking force to and from a wheel assembly of the vehicle, the sensing device comprising (a) a first attachment structure operatively connected to the activation member, (b) a second attachment structure operatively connected to the brake cable and mounted to the first attachment structure to enable relative linear movement between the first and second attachment structures, (c) an actuating member provided on one of the first and second attachment structures, (d) a biasing structure positioned between the first and second attachment structures and enabling the force to be transferred from the activation member and the first attachment structure to the brake cable and the second attachment structure through the biasing structure with the biasing structure resiliently deflecting to allow relative linear displacement between the first and second attachment structures in an amount related to the magnitude of the force, (e) a sensor including a first switch and a second switch, each of the first and second switches being adapted to be actuated by the actuating member, the actuating member being positioned to actuate the first switch upon reaching a predetermined maximum linear displacement between the first and second attachment structures, the actuating member being positioned to actuate the second switch upon reaching a predetermined minimum linear displacement between the first and second attachment structures, the predetermined maximum displacement corresponding to an amount of force sufficient to fully apply the brake mechanism and the predetermined minimum displacement corresponding to an amount of force sufficient to fully release the brake mechanism, and (f) a signal responsive device connected to the sensor of the sensing device, the signal responsive device being operable responsive to actuation of the first and second switches by the actuating member, the method comprising:

moving the activation member to vary a force applied to the cable through the sensing device to vary tension in the cable;

actuating with the actuating member one of the first switch upon the first and second attachment structures reaching the predetermined maximum displacement and the second switch upon the first and second attachment structures reaching the predetermined minimum displacement; and the signal responsive device performing a function in response to actuation of the actuated switch.

* * * * *